United States Patent Office 3,785,915
Patented Jan. 15, 1974

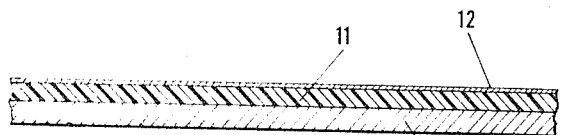
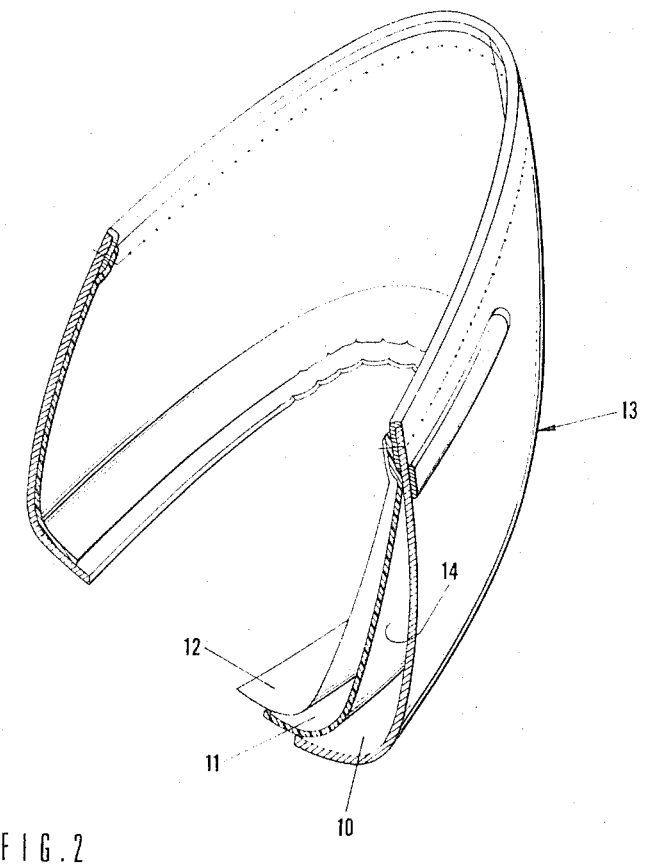

3,785,915
SHOE LINING AND COUNTER STIFFENER
Addison Walker Closson, Jr., 30 Coolidge Ave.,
Cambridge, Mass. 02138
Continuation-in-part of abandoned application Ser. No. 691,287, Dec. 18, 1967. This application Aug. 24, 1970, Ser. No. 66,634
Int. Cl. A43b 13/42
U.S. Cl. 161—150
3 Claims

ABSTRACT OF THE DISCLOSURE

A shoe lining and counter stiffener is made from a multiply laminate having a ply of a nondirectional nonwoven fabric and a ply of thermoplastic (elastomeric) film material. To facilitate application of the laminate to a shoe, a thermally tackified adhesive is applied to the thermoplastic ply on the side opposite the fabric ply.

RELATED APPLICATION

This application is a continuation-in-part of U.S. Ser. No. 691,287, filed on Dec. 18, 1967, now abandoned, by Addison W. Closson, Jr. and entitled Shoe Lining and Counter Stiffener.

(A) FIELD OF THE INVENTION

The present invention relates to plastic-fabric laminates. More particularly, it relates to laminates of plastics and nonwoven fabrics useful as a combination shoe lining and counter stiffener.

(B) DESCRIPTION OF THE PRIOR ART

In the manufacture of shoes, it is common to stiffen certain portions of the shoe, such as the counter, so that the shoe will maintain its shape during use. Heretofore counter stiffening has generally been accomplished by including a layer of stiffening material between the outer leather layer and an inner textile lining. The stiffening material typically is fiberboard, plastic-impregnated fabric, or molded plastic.

The fabrication of molded fiber shoe counters can be particularly vexatious. One reason for this is that the counter material must be molded or shaped to permit bending in two directions. This, of course, tends to cause wrinkles, although this is less of a problem than it once was. Another problem, which is particularly associated with the use of fiberboard stiffeners, is that they must be thick enough to be rigid. This often makes the counter too thick to be easily moldable. In addition, once bent during use of the shoe, the fiber stiffener tends to stay bent rather than to spring back into shape.

A commonly used counter lining and stiffener is described in U.S. Pat. No. 2,619,441 to Levy. This patent discloses a fabric material, preferably a flannel, which is impregnated with polyvinyl acetate to provide a foundation or a base. A suede flocked material is then adhered to the foundation. The lamination of two plys to textile material (lining and foundation) also contributes some stiffness and resilience.

One of the drawbacks accruing from such a combination counter lining and stiffening material made from woven or directional fabrics is the tendency of the material to break during the shoe manufacturing process either when being molded or when the last is removed from the shoe. This problem can be minimized if care is taken to cut the counter directly across the woven material, that is, to lay the counter out on the material so that it spreads from selvage to selvage. This enables the material to exhibit a maximum amount of stretch when the counter is being molded and the last pulled from the shoe. It is during these operations in the shoe manufacturing process that the counter is most subjected to stress. Even when cut properly, however, counters do occasionally break because of other factors such as careless last pulling, excessive dryness or tight patterns used with lasts having narrow top lines and large heels or failure to adequately preheat the material before molding.

To minimize breakage and thereby reduce the cost of rejects, constant supervision is necessary to assure that cutters will cut counters exactly across the fabric in order to maximize stretch. Since many cutters are paid in accordance with the number of pieces they produce, they tend to concentrate more on the quantity of pieces they cut than on how each piece is cut. Thus it becomes necessary either to tolerate a high reject rate or to increase the supervisory cost. In addition, if the material can be cut in any direction, an increase in yield of material up to 5% is sometimes realized.

It is, therefore, an object of the present invention to provide a combined shoe lining and counter material which is nondirectional; that is, one which may be cut and stretched in any direction.

Another object of the present invention is to provide a nondirectional material which is suitable for providing stiffening and resiliency for shoe counters and linings (such as quarters linings) while reducing the shoe manufacturing cost.

Other objects of the invention will in part be obvious and will in part appear hereinafter.

The invention accordingly comprises an article of manufacture possessing the features, properties, and the relation of elements which will be exemplified in the article hereinafter described, and the scope of the invention will be indicated in the claims.

SUMMARY OF THE INVENTION

Briefly, my shoe lining and counter stiffener is a multi-ply material which includes a ply of a nondirectional non-woven fabric and a ply of thermoplastic (elastomeric) film material integrally bonded to the fabric. In one embodiment, I also use a thermo-sensitive adhesive on the outside surface of the thermoplastic material so that my counter material may be bonded to the outer shoe leather by the use of heat and pressure alone.

The material may be made thinner than most systems previously employed while providing adequate rigidity or stiffness. Also, it is made from inexpensive, readily available component materials and is nondirectional, that is, it may be cut and stretched in any direction with little likelihood of breakage. In addition, it has been found that the use of a transparent elastomeric film as the stiffening material provides the advantage of optically blending the stiffening material into the color of the quarter material or lining and thereby provides an aesthetically pleasing effect.

By nondirectional is meant omnidirectional, i.e., the various fibers are oriented in all directions rather than preferentially oriented in one or two directions so that the strength and elongation properties of the fabric are anisotropic. This random orientation is largely responsible for the advantages possessed by the product of the invention.

By non-woven fabric is meant that class of fabrics wherein fibers are matted together, usually in a random or non-directional manner, and are not held in place by interweaving. Some such fibers are formed into sheets comprising a major portion of fibers and a minor portion of polymer binder. Most advantageous for the purposes of the instant invention, are the so-called "spun-bonded" or "contact-bonded" non-woven materials wherein the primary force holding the fibers together is their adherence to one another, usually caused by the interlocking of tiny fibrils on the main body of the fiber and the surface forces resulting from vast surface area of the individual fibers and the large number of fibrils thereon.

The thermoplastic ply is constructed out of a thermoelastomeric material having a Vicat softening point of at least 130° F., advantageously 130° F. to 220° F., and of the type that is comprised primarily of a polymer which is generally injection molded at machine temperatures of 325° F. or more. The minimum injection molding temperature (as an empirical parameter relating to this invention) is based on a determination as used in reporting this temperature in the Modern Plastics Encyclopedia of 1965 and included as a supplement in said encyclopedia issue (McGraw-Hill, New York, 1964). Such thermoplastics are not to be confused with hot-melt adhesives which, when used in conjunction with the thermoplastic, should not only soften but melt to a tacky composition below about 260° F. and preferably in the range of 140° F. to 260° F. Normally these hot-melt adhesives are selected to remain tack free below about 140° F.

Among the useful thermoplastics are the following copolymrs having Vicat softening point of from about 130° F. to about 220° F., but not melting to form a tacky polymeric composition at such temperatures:

(1) acrylonitrile-butadiene-styrene copolymer
(2) acrylonitrile-styrene copolymer
(3) styrene-butadiene copolymer.

Also useful as thermoplastics are poly(vinyl chloride), polyethylene, polypropylene, and polyolfin ionomers.

It has been found advantageous to co-extrude from 7 to 25% by weight of glass fibers with the thermoplastic to achieve increased stiffness when such increased stiffness is a desirable characteristic of the product.

DESCRIPTION OF THE PREFERRED EMBODIMENT

In FIG. 1, a layer of outer shoe leather 10 is shown with my shoe lining and counter stiffening material bonded to it. The layer or ply 11 is formed of a suitable thermoplastic material, such as polystyrene, and the ply 12 is a nonwoven material such as Reemay (trademark of E. I. du Pont de Nemours & Company for their nonwoven, spun-bonded polyester fabric).

My material is highly suitable for use as a combined stiffener and lining for shoe counters as illustrated by the shoe counter 13 in FIG. 2. Here, the outer shoe leather 10 is shown partially separated from the thermoplastic ply 11 and the non-woven fabric ply 12. To facilitate bonding, a layer of thermosensitive adhesive 14 is on the outer surface of the thermoplastic layer 11. This enables bonding of my material to the outer shoe leather by means of heat and pressure alone.

The combination counter and lining material may be manufactured in various ways. One particularly useful way is to laminate the nonwoven fabric to the plastic at the time the plastic is extruded. For example, if the thermoplastic is being extruded by conventional slot die extrusion techniques, the fabric and the freshly extruded plastic may be fed together through a pair of nip rolls where the fabric is pressed into the extruded plastic while the plastic is still warm. This technique successfully bonds the fabric to the plastic, often making it unnecessary further to heat up the plastic to secure an adequate bond.

An alternative approach involves laminating the fabric and plastic by running the layers through Teflon (trademark of the E. I. du Pont de Nemours & Company for its polytetrafluoroethylene) coated stainless steel can-type rollers that are heated to the softening point of the thermoplastic in order to achieve a good bond with the fabric.

Yet another approach to laminating the fabric and plastic involves passing the thermoplastic layer through a bath containing a solvent or adhesive for the thermoplastic. This softens the plastic to the point where it will bond to the fabric at low temperatures.

Various readily available materials are suitable for use as both the thermoplastic ply and the fabric ply. For example, suitably plasticized polystyrene performs excellently as the thermoplastic layer on my material Reemay and synthetic or natural nondirectional nonwoven fabrics available from other manufacturers, such as The Kendall Company, are satisfactory choices for the fabric layer. When, for example, polystyrene is used as the resin layer, lamination to the fabric may be achieved at pressures of 15 to 20 p.s.i. in a temperature range of 350° to 400° F. Bonding occurs as soon as the polystyrene layer gets up to temperature.

While polystyrene is readily available and inexpensive, such other materials as acrylonitrile-butadiene-styrene copolymer, styrene-butadiene copolymer, Surlyn A (trademark of the E. I. du Pont de Nemours & Company for their synthetic resin ionomer consisting of polyethylene cross-linked by means of ionic grafted side chains), Thermolastic (trademark of The Shell Chemical Company for their styrene-butadiene rubber), Richardson 137 and 147 (trademark of The Richardson Company, Melrose Park, Ill., for their polystyrene blends including copolymers of styrene with other materials), impact grade ABS modified with 10% to 40% rubber and Union Carbide 5006 (trademark of Union Carbide Corporation for their impact grade polystyrene). Some of these products may be made even more suitable by the addition of plasticizers such as carbowax, castorwax, candelella wax or Santocizer 160 (trademark of The Monsanto Chemical Company for their wax-type plasticizer). These waxes and plasticizers can aid in achieving a desirable Vicat softening point in compositions utilizing polymers normally softening at higher temperatures.

The term "ionomer" as used in the above paragraph relates to that type of material described at col. 2 of U.S. Pat. 3,427,733 to Beckwith, i.e. the class consisting of polymers of α olefins having the general formula $$RCH=CH_2$$

where R is a radical selected from the class consisting of hydrogen and alkyl radicals having from 1 to 8 carbon atoms, the olefin content of the polymer being at least 50 mol percent based on the polymer, and an α,β-ethylenically unsaturated monocarboxylic acid, the acid monomer content of the polymer being from 0.2 to 25 mol percent, based on the polymer, the dicarboxylic acid copolymer containing uniformly distributed throughout the polymer a monovalent metal ion, in which at least 10 percent of the carboxylic acid groups of the monovalent and divalent carboxylic acid polymers are neutralized by the metal ions.

As pointed out above, the usefulness of my material is increased by the addition of a thermo-sensitive adhesive layer on the outside of the thermoplastic layer. I prefer to use adhesives that get tacky at a relatively low temperature and, once activated, stay tacky for a significant dwell time. The adhesive advantageously tackify in the range of 160° F. to 260° F. These criteria are readily met by a variety of adhesives. Suitable choices are, for example, adhesives consisting primarily of neoprene, ethylene-vinyl acetate copolymers, natural rubber, Surlyn D (trademark of E. I. du Pont de Nemours & Company for their latex version of Surlyn A) of poly(vinyl acetate). The choice of adhesive, of course, should bear some relation to the character of the thermoplastic layer; that is to say the adhesive must become operably tacky at a temperature well below, preferably 50° F. below, the minimum injection molding temperature of the thermoplastic tape layer.

It is apparent, therefore, that the multiply material of my invention may be fabricated by several low-cost techniques using conventional equipment. Furthermore, these processes are capable of utilizing a wide variety of readily available materials to produce my nondirectional shoe lining and counter stiffener.

It will thus be seen that the objects set forth above among those made apparent from the preceding description are efficiently attained and, since certain changes may be made in the above product without departing from the scope of the invention, it is intended that all matter contained in the above description shall be interpreted as illustrative and not in a limiting sense. It is also to be understood that the following claims are intended to cover all of the generic and specific features of the invention herein described, and all statements of the scope of the invention which, as a matter of language, might be said to fall therebetween.

What is claimed is:

1. A shoe counter stiffener article shaped to conform to the heel portion of a shoe and formed of a laminate comprising
    (A) a ply consisting essentially of a contact-bonded nondirectional, non-woven fabric of a synthetic polymer,
    (B) a ply of thermoplastic film bonded to said fabric, said thermoplastic having a Vicat softening point of at least 130° F., and
    (C) a ply of thermally-activatable adhesive over the aforesaid thermoplastic film and on the opposite side of said film from said fabric, said adhesive (1) being tack free below 140° F. and (2) melting below about 260° F.

2. An article as defined in claim 1 wherein said thermoplastic film is formed of a composition having a minimum injection molding temperature of 325° F.

3. An article as defined in claim 1 wherein said thermoplastic film is transparent.

References Cited

UNITED STATES PATENTS

| | | | |
|---|---|---|---|
| 3,020,169 | 2/1962 | Phillips et al. | 117—33 |
| 3,482,683 | 12/1969 | Desnoyers | 161—167 |
| 2,949,394 | 8/1960 | Rodman | 161—170 |
| 2,758,045 | 8/1956 | Heaton et al. | 36—77 M |
| 2,619,441 | 10/1950 | Levy | 161—167 |
| 2,840,492 | 6/1958 | Emerson | 36—77 M |
| 3,462,326 | 8/1969 | Steel et al. | 156—72 |
| 2,160,590 | 5/1939 | Guhman | 36—68 |
| 3,117,055 | 1/1964 | Guandique et al. | 161—170 |
| 3,427,733 | 2/1969 | Beckwith | 36—68 |
| 3,170,252 | 2/1965 | Rarich | 36—68 |
| 3,234,668 | 2/1966 | Radcliffe | 36—68 |
| 3,276,944 | 10/1966 | Levy | 161—157 |

OTHER REFERENCES

Reemay Spunbonded Polyester for Reinforcing Leather and Vinyl Shoe Linings (pub. No. 82, Du Pont Textile Fibers Dept.), pub. June 7, 1966.

Reemay Spunbonded Polyester for Coating (pub. No. 90, Du Pont Textile Fibers Dept.), pub. Aug. 8, 1966.

GEORGE F. LESMES, Primary Examiner

M. E. McCAMISH, Assistant Examiner

U.S. Cl. X.R.

36—68, 71 R; 161—151, 157, 167